United States Patent [19]

Kimura et al.

[11] 3,873,349

[45] Mar. 25, 1975

[54] PROCESS OF TREATING SURFACES OF METALS

[75] Inventors: Tadao Kimura; Atuhiko Murao; Toshigoro Kuwahara, all of Yokohama, Japan

[73] Assignee: Nippon Kokan Kabushiki Kaisha, Tokyo, Japan

[22] Filed: Mar. 13, 1972

[21] Appl. No.: 234,392

[30] Foreign Application Priority Data

Mar. 12, 1971  Japan.............................. 46-13075

[52] U.S. Cl..... 117/93.31, 117/132 B, 117/132 BE, 117/132 BF, 117/132 C, 117/133, 148/6.16, 148/6.2, 204/159.22

[51] Int. Cl. .......................... B44d 1/50, C08f 1/84

[58] Field of Search............. 117/93.31, 132 R, 133, 117/132 B, 132 BE, 161 A, 161 UA:161 UB, 161 UC, 161 UZ; 148/6.1 B, 6.2; 204/159.22; 260/78.4, 80 R, 80 PS, 89.7 C, 88.7 R, 89.5 R

[56] References Cited

UNITED STATES PATENTS

| 3,501,390 | 3/1970 | Turner............................ 117/161 K |
| 3,505,128 | 4/1970 | Fujii et al....................... 117/132 B |
| 3,519,495 | 7/1970 | Plaxton............................. 148/6.16 |
| 3,532,611 | 10/1970 | Takiguchi et al.................. 148/6.16 |
| 3,671,295 | 6/1972 | Ravve et al...................... 117/93.31 |

*Primary Examiner*—William D. Martin
*Assistant Examiner*—John H. Newsome
*Attorney, Agent, or Firm*—Moonray Kojima

[57] ABSTRACT

Both higher corrosion resistance and paint adherence are given to film formed on the surfaces of metals by treating the surfaces with aqueous solution of one or more materials selected from the group consisting of water soluble vinyl monomer, water soluble high polymer and then irradiating ionizing radioactive rays on the nearly dried surface film. When a water soluble inorganic compound is mixed with the above mentioned aqueous solution, the film properties are greatly improved.

8 Claims, No Drawings

PROCESS OF TREATING SURFACES OF METALS

BACKGROUND OF INVENTION

This invention relates to an improved process of treating surfaces of metals and more particularly to such process which increases corrosion resistance and paint adherence of converted film formed on surfaces of metals by means of irradiated ionized radioactive rays.

In processes for coating surfaces of metals by use of irradiating high energy, ionizing radiation to effect polymerization of the coatings has been promoted and used in the prior art. For example, the electrocoating and polymerizing method known as the Ford process, which is disclosed in U.S. Pat. Nos. 3,501,390 and 3,501,391, are typical of the art. The above process consists of electrodepositing a film forming polymerizable, organic coating material upon an electrically conductive object and polymerizing the film on the object by ionizing radiation. Usually there is employed a water dispersible, electro-depositable coating material with a water soluble amino compound as a dispersal assistant.

None of the prior art methods produces such converted surfaces which have excellent corrosion resistance and paint adherence.

SUMMARY OF INVENTION

Accordingly, an object of this invention is to provide a process of treating surfaces of metals to produce improved properties of superior corrosion resistance and excellent paint adherence.

The inventive process differs from the prior art processes in the film forming material used, and composition of aqueous solution of the employed material. The film forming material is selected from the group consisting of water soluble vinyl monomer, and water soluble high molecular compound. Aqueous solutions of the above materials are employed. Each of the materials may be employed singly or in mixtures of two or more. Furthermore, when a selected cation and/or anion is added to the above aqueous solution, the properties of the converted film are improved considerably. Thereafter, ionizing radioactive rays are irradiated on the converted film. The formed film is converted to a substance which is insoluble against water and organic solvents, in addition to being polymerized and bridged.

DETAILED DESCRIPTION OF PREFERRED EMBODIMENTS

In accordance with this invention, the term "water soluble vinyl monomer" as employed herein, includes unsaturated acid, such as maleic acid, crotonic acid, itaconic acid, acrylic acid, methacrylic acid and the like; metallic salt of the above unsaturated acids having divalent atoms, unsaturated compounds, such as acrylic amide, methacrylic amide, acrylonitrile, and the like; and vinyl ester phosphate, such as 2-acid phosphoxyethyl methacrylate having the formula:

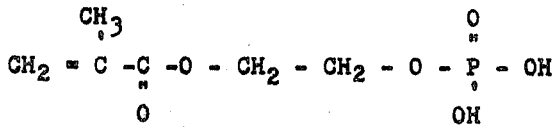

3-chlor-2-acid phosphoxypropyl methacrylate having the formula:

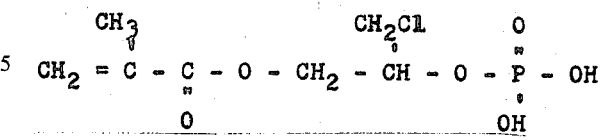

The term "water soluble high molecular compound" as used herein, includes a polymer or copolymer of acrylic or methacrylic ester, polyvinyl alcohol, polyvinyl alcohol - maleic copolymer, polyvinylether-maleic copolymer, polyethylene-maleic copolymer, itaconic - acrylonitrile copolymer, water soluble organic high molecular compound sulfonate, water soluble polymer having vinyl radical as carboxylic modified epoxydiacrylate or polyethylene glycol diacrylate, water soluble natural rubber or other water soluble synthetic high molecular compound.

The term "a selected metallic cation having divalent atom" as used herein means that each of Ca, Mg, Zn, Cr, Al, Fe, and Ni, is added to the treating aqueous solution with water soluble matter.

The term "a selected anion" as employed herein includes chromic acid, bichromic acid, phosphoric acid, boric acid, nitric acid, sulfuric acid, titanic acid, permanganic acid, fluosilicic acid, borofuoric acid and the like. Especially preferred are the anions of chromic acid, bichromic acid and phosphoric acid.

The term "ionizing radioactive rays" as employed herein includes proton-, alpha, beta, gamma, x-rays, or accelerating electron beams. The use of the accelerating electron beam among the above mentioned rays is especially recommended as having the best suitable rays in industrial scale use.

The invention may be applied to steel sheets, galvanized steel sheets, aluminized steel sheets, aluminum sheets, or other metallic materials.

The treatment of the above materials comprises the following steps. First, the film forming material, which is selected from the group consisting of water soluble vinyl monomers and water soluble high molecular compounds is coated on the metallic material by known steps of dipping, roller coating, electrodepositing or the like. The formed film on the surface results in a water soluble material.

Successively, the film is almost or nearly dried by known hot blast or other suitable means. Then, the ionizing radioactive rays are irradiated on the film. By such irradiation, water soluble film is cured to material which is insoluble in water or organic solvents. Also, there occurs polymerization reaction and crosslinking reaction among the polymer chains of the film material. When each of the film forming materials is used individually, the inventive process is effective in improving corrosion resistance and paint adherence of cured film. When a mixture of the film forming material is employed, the film properties are substantially improved over those obtained using a single material.

When a selected cation and/or anion is further added to the aqueous solution of the film forming material, the film properties are improved to the highest degree. This has been confirmed by many experiments. It may be theorized, although not necessarily with absolute certainty, that improvments result from forming salt having double bonds by addition of the cation and/or anion and then curing into a net polymer having three dimentional structure by irradiation of the ionizing radioactive rays.

When the employed monomer or polymer is an unstable material exhibiting a tendency of being decomposed with addition of the anion, the following treatment may be used. First, the chemical conversion treatment is carried out by inorganic compound and then the aqueous solution of the monomer or polymer is coated thereon for curing by irradiation of the ionizing radioactive rays. By this treatment it is possible to easily obtain the same film properties as those resulting from treatment with mxing of aqueous solution of the film forming material and the anion.

The irradiating of the ionizing radioactive rays is carried out by well known process and means. However, it should be noted that such an inert gas as $N_2$, $CO_2$ or $He_2$, and not including $O_2$, is desirable as irradiating medium for the ionizing radioactive rays, while the rays, of course, are possible to be irradiated through the atmosphere or vacuum. This is because the employing of inert gas causes the required amount of beam current to decrease.

Actual examples of this invention are as follows:

EXAMPLE I

This is an example of treating metal with only water soluble vinyl monomer.

| | |
|---|---|
| Composition of aqueous solution | |
| calcium acrylate 10 parts | by weight (the same |
| water 90 parts | will apply hereinafter) |
| Treated metal material | galvanized steel |
| Drying means | hot blast |
| Employing ionizing radiation | |
| Accelerating electron beam | 300 KV, 25 mA |
| irradiating medium | air, normal temperature |
| irradiating time | 2 sec. |
| Testing | |
| Method | Salt spray testing, JIS |
| results | No white stain for 5 hours. |

In the case of no irradiation with the beam, the galvanized steel sheet was wholly covered with fog after 30 minutes.

EXAMPLE II

This is an example of treating metal with only water soluble high molecular compound.

| | |
|---|---|
| Composition of aqueous solution | |
| Polyacrylic ammonium | 5 parts |
| Water | 95 parts |
| Treated metal material | galvanized steel sheet |
| Drying means | hot blast |
| Employing ionizing radiation | Same as Example 1. Medium was $N_2$. |
| Testing | Bath method and results were the same as in Example I |

In the case of no irradiation with the beam, the galvanized steel sheet was wholly covered with fog after 1 hour.

EXAMPLE III

This is an example of treating metal with mixture of water soluble vinyl monomer and inorganic compound.

| | |
|---|---|
| Composition of aqueous solution | |
| acrylic monomer | 3.35 parts |
| zinc oxide | 1.65 parts |
| chromium trioxide | 1.00 parts |
| water | 94.00 parts |
| Testing metal material | galvanized steel sheet |
| Drying means | hot blast |
| Employing ionizing radiation | |
| Accelerated electron beam | 300 KV |
| Amount of absorption beam current | 5 M. Rad |
| Irradiating medium | $N_2$ |
| Testing | |
| Method | Same as Example I |
| Results | No fog for 96 hours. |

In the case where no irradiation with the beam, the galvanized steel sheet was wholly covered with fog after 24 hours.

EXAMPLE IV

This is an example of treating metal with mixture of water soluble vinyl monomer and inorganic compound as that of Example III, except unsaturated carboxylic monomer, such as crotonic acid, maleic acid or itaconic acid was used in place of acrylic acid of Example III, and at the same time, Zinc Oxide equivalent to hydrogen of carboxylic group was added to the aqueous solution.

Testing results were the same as that of Example III.

EXAMPLE V

This is an example with mixture of water soluble high molecular compound and inorganic compound.

| | |
|---|---|
| Composition of aqueous solution | |
| Copolymer resin of acrylonitrile and itaconic acid | 7 parts |
| Bichromic ammonium | 0.5 part |
| Water | 92.5 parts |
| Tested metal material | galvanized steel sheet |
| Employing ionizing radiation after drying, accelerated electron beam | 300 KV, |
| medium | $N_2$ |
| amount of absorption beam current | 10 M.Rad |
| Testing | |
| Method | Same as in above Examples. |
| Results | No white stain for 120 hours. |
| Paint adherence test. | |
| Employed paint | baking type melamine |
| method | JIS test |
| results | no friction. |

EXAMPLE VI

This is an example of treating metal with mixture of water soluble vinyl chloride, water soluble high molecular compound and inorganic compound.

| | |
|---|---|
| Composition of aqueous solution | |
| Acrylamide | 1 part |
| Itaconic acid | 2 parts |
| Maleic polybutadiene | 5 parts |
| Chromium sulfate | 2 parts |
| Bichromic ammonium | 8 parts |
| Water | 82 parts |
| Tested metal material | Cold reduced steel sheet |
| Employing ionizing radiation after drying | |
| accelerated electron beam | 150Kv, 300 KV, 500 KV |
| Medium used | $N_2$ |
| Amount of Absorption beam current | 0.5 to 20M.Rad. |

-Continued

| Testing | |
|---|---|
| Method | Same as Example I |
| Results | No white stain for 96 hours. |

The film formed as mentioned above exhibited excellent adherence for melamine, alkyd, acrylic and epoxide type paint, which was done in accordance with the JIS (Japanese Industrial Standards). Moreover, tests of irradiating the electron beam was carried out within the range of 60°C to −10°C. As a result, the film properties was found to be tending to improve in some degree as the medium temperature increased. However, it seems that the film properties are practically unchanges at various temperatures.

EXAMPLE VII

This is the same as Example VI.

| Composition of aqueous solution. | |
|---|---|
| magnesium acrylate | 2 parts |
| water soluble epoxide resin | 1 part |
| bichromic ammonium | 6.5 parts |
| phosphoric acid | 0.5 part |
| water | 90.0 parts |
| Tested metal material | cold reduced steel sheet |
| Employing ionizing radiation after drying. | |
| Accelerated electron beam | 300 KV |
| Medium | $N_2$ |
| Amount of absorption beam current | 5 M.Rad |
| Testing | |
| Method | Same as Example I |
| Results | No fog for 120 hours. |

The film properties exhibit excellent paint adherence as shown in above disclosed examples.

EXAMPLE VIII

This is an example of treating metal with mixture of water soluble vinyl monomer, aqueous emulsion of high molecular compound and inorganic compound.

| Composition of aqueous solution | |
|---|---|
| Aqueous emulsion of polyvinyl acetate | 5 parts |
| polyethylene oxide | 1 part |
| chromic anhydride | 4 parts |
| ammonium silicofluoride | 0.3 parts |
| water | 89.7 parts |
| Tested metal material | Aluminum plate. |
| Employing ionizing radiation after drying | |
| accelerated electron beam | 300 KV |
| medium | $N_2$ |
| amount of absorption beam current | 5M.RAd |
| Testing | |
| method | Same as Example I |
| results | No white stain for 120 hours. |

Moreover, the formed film exhibited good scratch resistance. Next, the above treatment was carried out for aluminized steel sheet in place of the aluminum plate. The formed film exhibited the same properties as that of aluminum plate.

EXAMPLE IX

This is an example of treating metal with mixture of water soluble high molecular compound and inorganic compound.

| Composition of | |
|---|---|
| copolymer of acrylic ester and acrylic ammonium | 0.1 part |
| bichromic ammonium | 0.9 part |
| water | 99.0 parts |
| Tested metal material | galvanized steel sheet. |
| Employing ionizing radiation after drying | |
| Accelerated electron beam | 300 KV |
| Medium | $N_2$ |
| Amount of absorption beam current | 10 M.Rad |
| Testing | |
| Method | Same as Example I |
| Results | No white stain for 72 hours. |

EXAMPLE X

This is an example of treating metal with mixture of water soluble vinyl monomer, other vinyl monomer and inorganic compound.

| Composition of aqueous solution | |
|---|---|
| Carboxylic modified epoxydiacrylate | 3.5 parts |
| 2-acid phosphoxyethyl methacrylate | 1.5 parts |
| zinc bichromate | 1.4 parts |
| water | 93.6 parts |
| Tested Metal Material | galvanized steel sheet and electro-zinc-plating steel sheet. |
| Employing ionizing radiation after drying | |
| Accelerated electron beam | 30 KV |
| Amount of absorption beam current | 20 M.Rad |
| Testing | |
| Method | Same as Example I |
| Results | No white stain for 200 hours. |

Moreover, the formed film exhibited excellent paint adherence.

EXAMPLE XI

This is the same example as shown in Example X, except the treating steps are different. The tested metal materials are subjected to known chromate treating and then dipped into the aqueous solution of vinyl chloride monomers. As a result, the formed film exhibited the same properties as shown in Example X.

EXAMPLE XII

This example is treated as in Example XI, except electrolytic chromate process is used in place of non-electrolytic chromate process. The resultant film properties were as good as Example XI.

EXAMPLE XIII

This is an example of treating metal with aqueous emulsion of high molecular compound.

| Composition of aqueous solution. | |
|---|---|
| emulsion of carboxylic modified 1.2 polybutadiene | 5 parts as solid component. |
| water | 95 parts |
| Tested metal material | cold reduced steel sheet |
| Employing ionizing radiation | |
| Accelerated electron beam | 300 KV |
| Amount of absorption beam current | 6 M. RAd. |
| Medium | $CO_2$ |
| Testing | |
| Method | Same as Example I |
| Results | No white stain for 48 Hours. |

Moreover, the formed film exhibited excellent paint adherence.

Examining the above examples, as to film properties, it may be concluded that there are many distinctive features of this invention. For example, the formed film is water soluble because of treatment with only water soluble material. For making the film passive, known ionizing radioactive rays are applied in a curing process to the film. By such means the film becomes insoluble to water and organic solvents. Consequently, it is remarkably improved in corrosion resistance and paint adherence. Secondly, a selected cation and/or anion is further added to the aqueous solution of the film forming material. This addition causes a salt having two double bonds in the film, to form. Then successive irradiating with radioactive rays converts the film into net polymer having three-dimentional structure. The properties of the finally formed film is improved to the highest degree.

The inventive process, it has been experimentally confirmed, should be carried out with the desirable mixing ratio of organic material to inorganic material within the range of 9:1 to 1:9, and preferably 4:6 by weight. Moreover, the employed electron beam voltage should be within the range of 150KV to 500 KV, and preferably less than 300 KV. Beam current of more than 25 MA are recommended for industrial application, as confirmed by the above examples. However, the coating amount and thickness of film forming material may be selected in accordance with the objected employed.

It should be noted that this invention shows the highest improved properties of formed film and production efficiency for the coating of both ordinary metal products and metal strips which are treated with very high speeds.

The foregoing description is intended to be only illustrative of the principles of this invention. Numerous other variations and modifications thereof would be apparent to one skilled in the art. All such modifications and variations are to be considered to be within the spirit and scope of this invention.

What is claimed is:

1. A method of coating metal substrates by applying a composition comprising an aqueous solution of water soluble vinyl monomer and an inorganic ionic material to said metal substrates, said inorganic ionic material containing a cation selected from the group consisting of Ca, Mg, Zn, Cr, Al, Fe and Ni; or an anion selected from the group consisting of chromate, bichromate, phosphate, borate, nitrate, sulfate, titanate, permanganate, fluosilicate and fluoborate; or mixtures thereof; drying the coated substrates, and irradiating the dried composition on the metal substrates with ionizing radiation.

2. Process of claim 1, wherein said water soluble vinyl monomer is selected from the group consisting of unsaturated acid, metallic salt of said unsaturated acids having divalent atom, unsaturated acid amide, unsaturated acid nitrile, and vinyl ester phosphate.

3. Process of claim 2, wherein said unsaturate acid is maleic acid, crotonic acid, itaconic acid, acrylic acid or metacrylic acid; wherein said unsaturated acid amide is acrylic amide or methacrylic amide and said unsaturated acid nitrile is acrylonitrile; and wherein said vinyl ester phosphate is 2-acid phosphoxyethyl methacrylate or 3-chloro-2-acid phosphoxypropyl methacrylate.

4. Process of claim 1, wherein said ionizing radioactive rays includes proton, alpha rays, beta rays, gamma rays, x rays, and accelerated electron beam.

5. Process of claim 1, wherein the mixing ratio of said organic monomer to inorganic material is within the range of 9:1 to 1:9 by weight.

6. Process of claim 5, wherein said mixing ratio is 4:6 by weight.

7. Process of claim 4, wherein said accelerating electron beam is employed with a beam voltage of between 150 KV and 500 KV, and beam current is more than 25 mA.

8. Process of claim 7, wherein said voltage is less than 300 KV.

* * * * *